(12) United States Patent
Biaud

(10) Patent No.: US 8,550,567 B2
(45) Date of Patent: Oct. 8, 2013

(54) JUVENILE VEHICLE SEAT

(75) Inventor: Richard M Biaud, Trementines (FR)

(73) Assignee: Cosco Management, Inc., Wilmington, DE (US)

( * ) Notice: Subject to any disclaimer, the term of this patent is extended or adjusted under 35 U.S.C. 154(b) by 488 days.

(21) Appl. No.: 12/794,407

(22) Filed: Jun. 4, 2010

(65) Prior Publication Data

US 2010/0308631 A1    Dec. 9, 2010

(30) Foreign Application Priority Data

Jun. 4, 2009  (FR) ...................................... 09 53710

(51) Int. Cl.
*A47D 15/00*        (2006.01)

(52) U.S. Cl.
USPC .......................... 297/482; 297/484; 297/250.1

(58) Field of Classification Search
USPC ...................... 297/250.1, 482, 484
See application file for complete search history.

(56) References Cited

U.S. PATENT DOCUMENTS

| | | | |
|---|---|---|---|
| 6,464,294 B1 | 10/2002 | Kain |
| 6,626,493 B2 | 9/2003 | Kain |
| 6,688,685 B2 | 2/2004 | Kain |
| 6,779,843 B2 | 8/2004 | Kain |
| 7,246,852 B2 | 7/2007 | Balensiefer |
| 7,306,284 B2 | 12/2007 | Horton et al. |
| 7,669,926 B2 | 3/2010 | Balensiefer |
| 2005/0212342 A1 | 9/2005 | Kain et al. |

FOREIGN PATENT DOCUMENTS

| | | |
|---|---|---|
| EP | 1123833 | 8/2001 |
| EP | 1625983 | 2/2006 |
| WO | 0166380 | 9/2001 |

OTHER PUBLICATIONS

International Search Report dated Jan. 18, 2010, for French Patent Document FR 0953710.

*Primary Examiner* — David E Allred

(74) *Attorney, Agent, or Firm* — Barnes & Thornburg LLP

(57) ABSTRACT

A seat for children intended to be installed in a vehicle, in particular an automobile, comprising a seat bottom, a seat back, and a headrest, the headrest is mobile in translation relatively to the seat back between a lost position and a high position. The seat includes a child-restraint harness intended to maintain a child seated in the seat and configured to include two shoulder straps, each of the shoulder straps carrying a strap-receiving pad adapted to contact a child seated on the seat bottom.

36 Claims, 5 Drawing Sheets

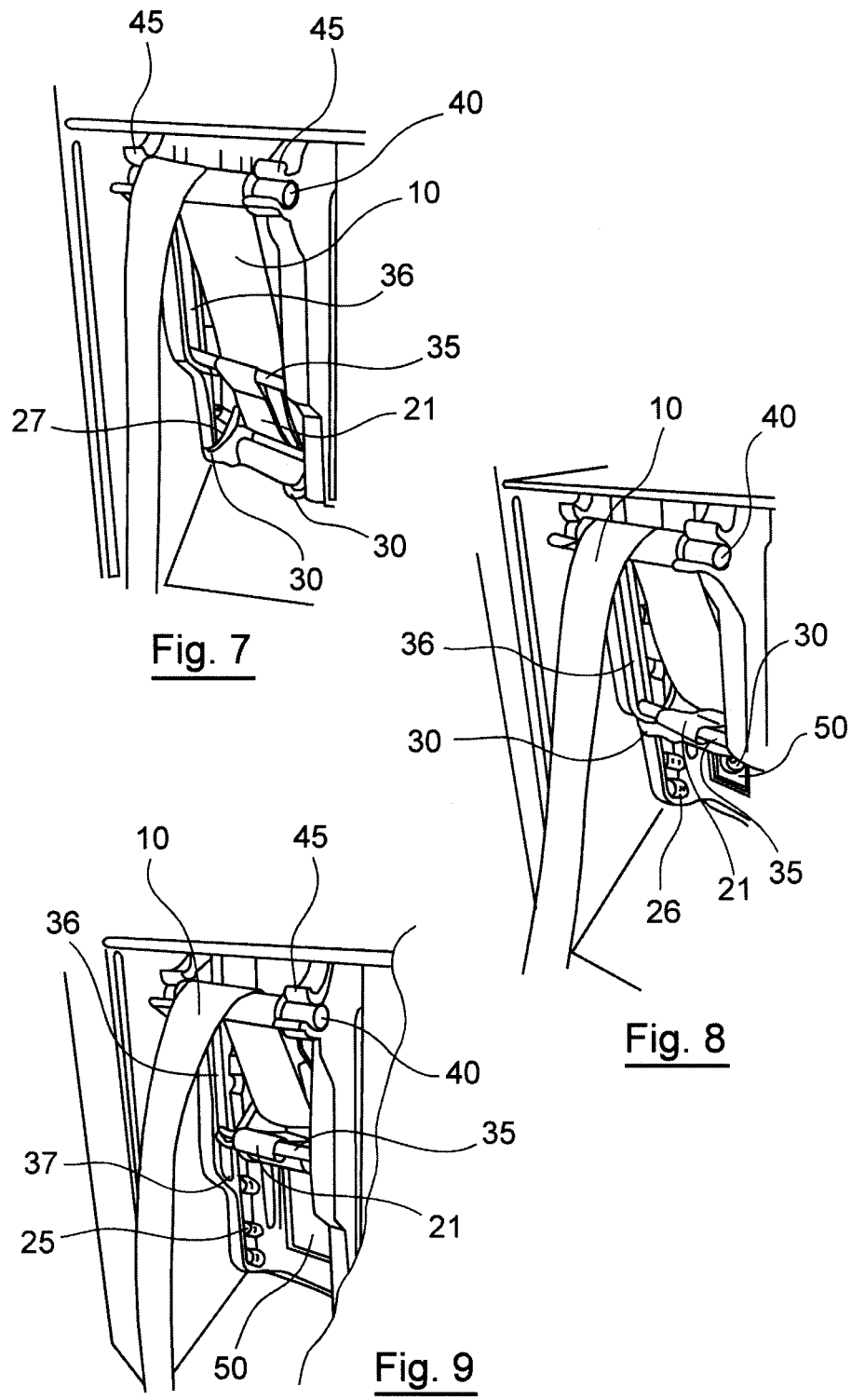

JUVENILE VEHICLE SEAT

BACKGROUND

The present disclosure relates to a juvenile vehicle seat and, in particular, to a seat including a seat shell, a headrest mounted for up-and-down movement on the seat shell, and a child-restraint harness coupled to the seat shell. More particularly, the present disclosure relates to a pad mounted on a shoulder strap included in the child-restraint harness and movable relative to the seat shell in response to movement of the headrest relative to the seat shell.

SUMMARY

A juvenile vehicle seat in accordance with the present disclosure includes a seat shell, a child-restraint harness coupled to the seat shell, and a headrest mounted for up-and-down movement on a seat back included in the seat shell relative to a seat bottom also included in the seat shell. The seat further includes a strap-receiving pad coupled to each of the shoulder straps included in the child-restraint harness.

In illustrative embodiments, the seat further includes means for changing the position of each strap-receiving pad on a companion one of the shoulder straps in response to up-and-down movement of the headrest to cause each of the strap-receiving pads to be separated from the headrest and linked to the seat shell in a lower range of movement of the headrest relative to the seat back between a low position and a relatively higher predefined intermediary position above the seat bottom and to be linked to the headrest to move therewith relative to the seat back in an upper range of movement of the headrest relative to the seat back between the predefined intermediary position and a relatively higher high position above the seat bottom. Each strap-receiving pad is mounted for movement on and along its companion shoulder strap to occupy a position on that strap that is a function of the size of the child seated on the seat bottom and the height of the headrest above the seat bottom.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying Figs. in which:

FIGS. 7-9 show diagrammatically and partially, as a rear view, a seat in accordance with the present disclosure, when the headrest is respectively in a low position on the seat back as suggested in FIG. 7, in a predefined intermediary position as suggested in FIG. 8, and in an intermediary upper position located above the predefined intermediary position (and below the high position) as suggested in FIG. 9;

DETAILED DESCRIPTION

Figure 1:
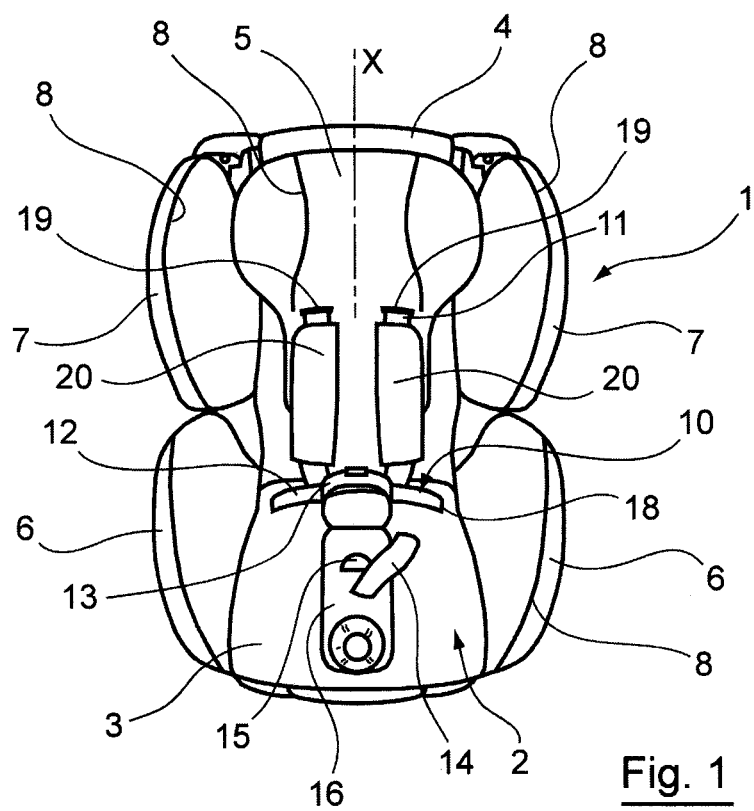
FIG. 1 is a diagrammatical front view of a juvenile vehicle seat in accordance with the present disclosure.

The front side of a juvenile vehicle seat 1 in accordance with the present disclosure is shown, for example, in FIG. 1. The juvenile vehicle seat comprises a seat shell 2 and a child-restraint harness 10 coupled to the seat shell 2 as suggested in FIG. 1. The seat shell 2 comprises a seat bottom 3, a seat back 4 extending upwardly from seat bottom 3 according to a substantially vertical axis X, and a headrest 5 mounted for up-and-down movement on seat back 4.

The headrest 5 is arranged within the seat shell 2 in such a way as to be able to occupy several positions, and to be mobile in translation relatively to the seat back 4 between a low position and a relatively high position, according to the X axis. A low position of headrest 5 is shown, for example, in FIGS. 1, 3, and 4. A high position of headrest 5 is shown, for example, in FIGS. 5 and 6.

In this example, the seat bottom 3 is bordered on either side by armrests 6 and the seat back 4 is bordered with protective elements 7. The armrests 6 and the protective elements 7 are arranged in order laterally to protect a child seated in the seat and also to provide comfort to the child.

Figure 2:
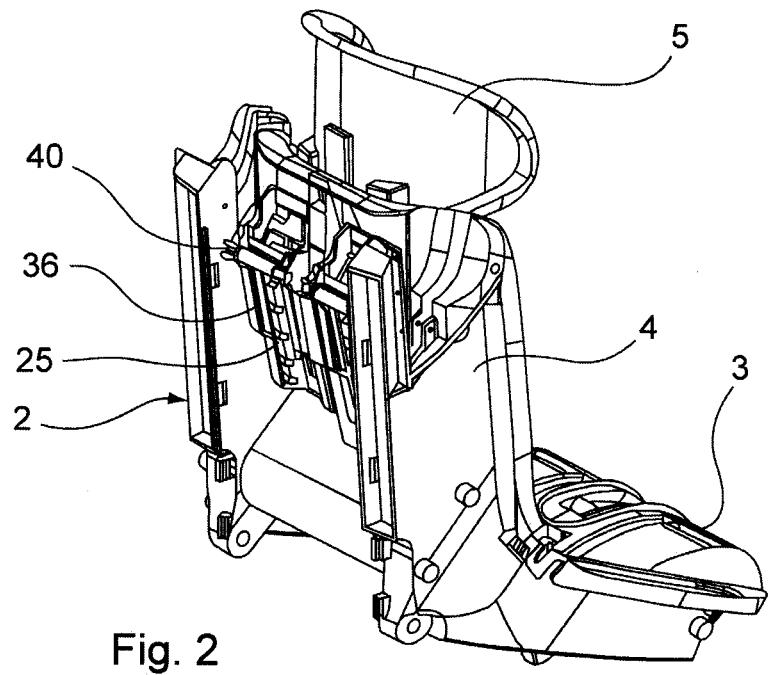
FIG. 2 diagrammatically shows in a ¾ rear and side view a seat structure in accordance with the present disclosure without armrests and a seat cover.

The various elements of the seat shell 2, i.e. the seat bottom 3, the seat back 4, the armrests 6, and the protective elements 7, and the headrest 5, are covered, as shown in illustrative embodiments, with elements of lining, generally comprising a foam covered with a fabric, in a manner known per se. The various pieces of fabric can be sewn together using stitches of which certain ones are visible and numbered 8 in FIG. 1. The rear side and the lateral side of the seat shell 2 has been shown in FIG. 2 separately devoid of elements of lining, harness, and retaining elements.

The seat 1 comprises, other than the seat shell 2 and the headrest 5, a child-restraint harness 10 comprising two shoulder straps 11 and lateral thigh belts 12. The two shoulder straps 11 and the lateral thigh belts 12 can be brought together by using a buckle 13 making it possible to restrain the child in seat shell 2.

The harness 10 is extended by a tab 14, constituting an end of the adjustment of the harness 10 of which the length can be modified, in such a way as to adjust the length of the harness 10, and in particular to tighten the harness 10, by pulling on the tab 14. The adjusting button 15 makes it possible to loosen the harness 10. A support 16 carries in particular the adjusting button 15 and an opening allowing for the passing of the tab 14.

The harness 10 further comprises a portion that is not visible from the front side of the seat 1, located on the rear side of the seat 1. The lateral thigh belts 12 and the shoulder straps 11 cross respectively the seat bottom 3 and the headrest 5 using openings 18 and 19 formed respectively in the seat shell 2 and the headrest 5, in the form of slots in the example shown. The openings 19 are fixed relatively to the headrest 5 and are therefore fastened in translation with the latter.

The seat 1 further comprises two tubular strap-receiving pads 20 carried on the shoulder straps 11. Each pad 20 provides a tubular cover for one of the shoulder straps 11 and is configured as a sleeve arranged to surround a companion one of the shoulder straps 11 of the harness 10. Each strap-receiving pad 20 is mounted for movement along and relative to its companion shoulder strap 11. The strap-receiving pads 20 are made in this example from fabric and foam and, for the portion coming into contact with the clothing of the child, from a material having a high friction coefficient, allowing for better retention of the child in the event of exposure of seat 1 to an external impact.

The headrest 5 is mobile in up-and-down translation relative to the seat back 4 and able to occupy at least one low position on seat back 4 and one high position on seat back 4. The user can adjust the position of the headrest 5 according to the positioning of the child in the seat shell 2.

The shoulder straps 11 of the harness 10 are arranged to engage the shoulders regardless of the size of the child. For this, two slots can be made in the headrest 5 and two large openings can be made in the seat back 4, in such a way in particular that the shoulder straps 11 of the harness 10 pass through these slots and can follow the up-and-down displacement of the headrest 5 relative to the seat back 4. The openings in the seat back 4 can also allow for the passage of a portion of the headrest 5 in order to allow for the displacement of the headrest 5 in relation to the seat back 4.

Figure 3:
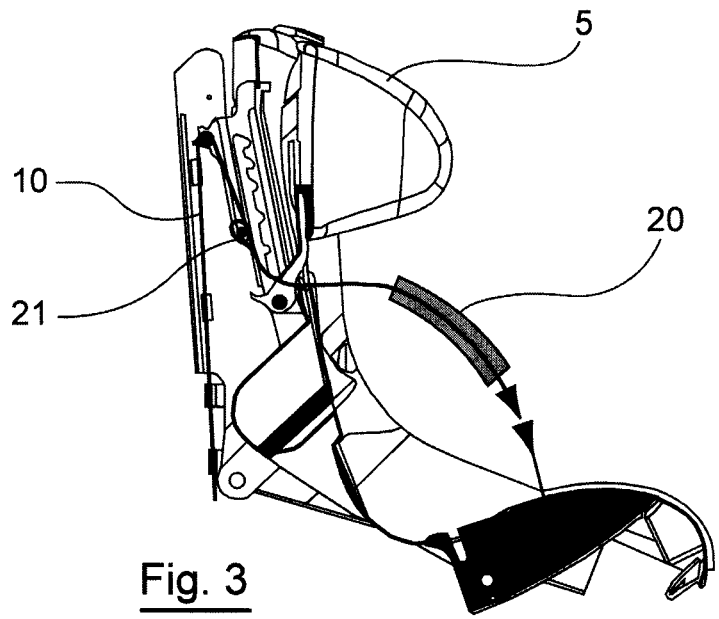
FIG. 3 is a diagrammatical cross-section view in a vertical plane of a seat in accordance with the present disclosure, the headrest being located in low position on the seat back.
Figure 4:
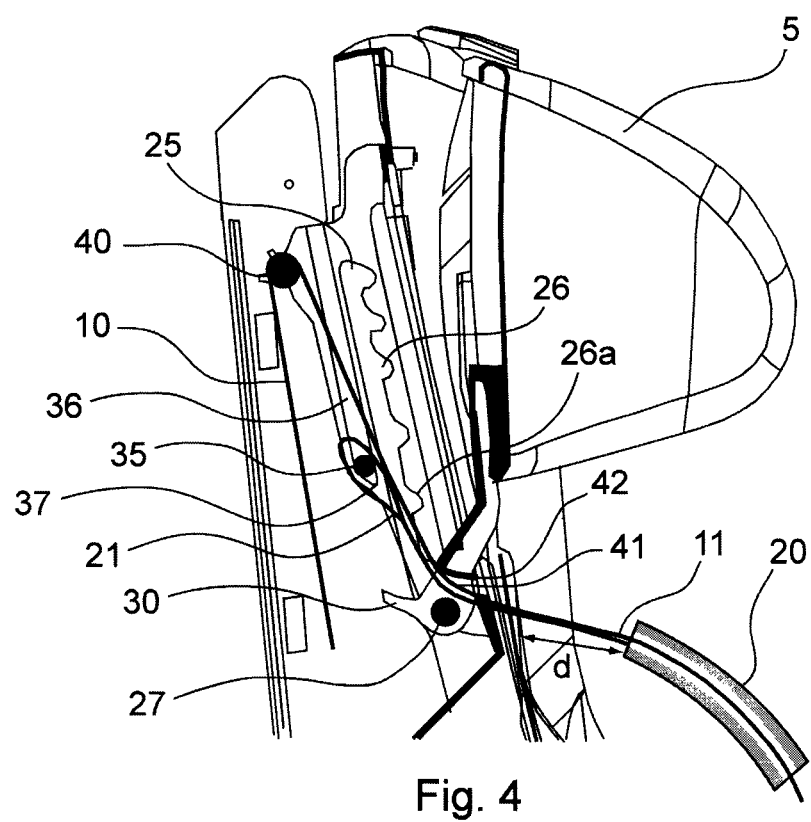
FIG. 4 is an enlarged view of a portion of FIG. 3.

Pads 20 are mounted on the shoulder straps 11 as suggested in FIGS. 3 and 4. These pads 20 comprise, for example, sleeves arranged to surround a portion of the shoulder straps 11 of harness 10, and in particular on the torso and the shoulders of the child.

The strap-receiving pads 20 are connected not only to the shoulder straps 11 but also to the seat shell 2 using retaining elements 21 in accordance with the present disclosure, such as straps or cables, each comprising a portion that can be seen, or that is apparent, on the front side of the seat 1 (but not visible in FIG. 1 as they are concealed by the shoulder straps 11). In the example shown, each tubular strap-receiving pad 20 is provided with a companion retaining element 21. Each strap-retaining pad 20 is therefore fixed to the seat shell 2 by the intermediary of the retaining element 21 independently of the harness 10 and is able to move up and down along its companion strap 11 while remaining tethered to the seat shell 2.

The challenge of correct pad positioning exists for the strap-receiving pads 20, which should be positioned correctly on the shoulders and on the thorax of a child seated in seat 1. Indeed, it is desirable that the strap-receiving pads 20 should be positioned correctly on the child in such a way as to restrain the child seated on the seat shell 2 in the event of an external impact to the seat 1, during the entire duration of the impact.

According to the present disclosure, shown in FIGS. 3-6, the retaining elements 21 are fastened by an elastic element to means of tensioning of the harness 10, always with the purpose of increasing the distance between the seat back 4 and the strap-receiving pads 20, as the height of the shoulder straps 11 increases above the seat bottom 3.

Figure 5:
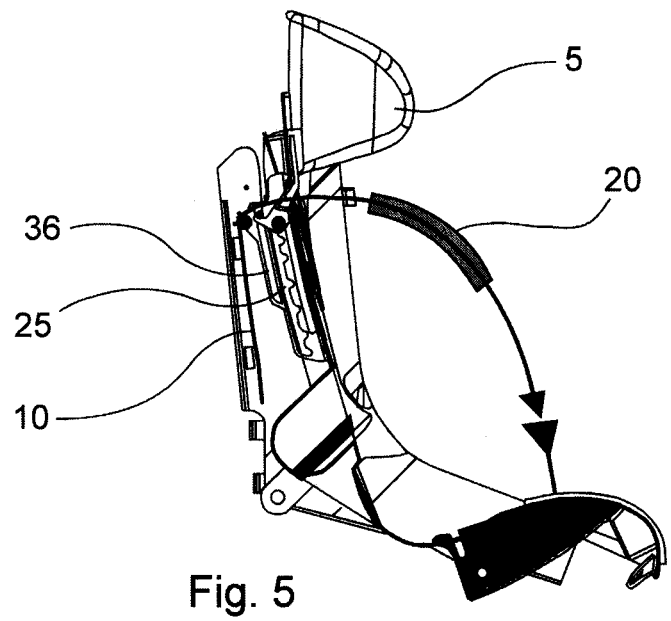
FIG. 5 is a diagrammatical cross-section view in a vertical plane of a seat in accordance with the present disclosure, the headrest being located in a relatively high position on the seat back.
Figure 6:
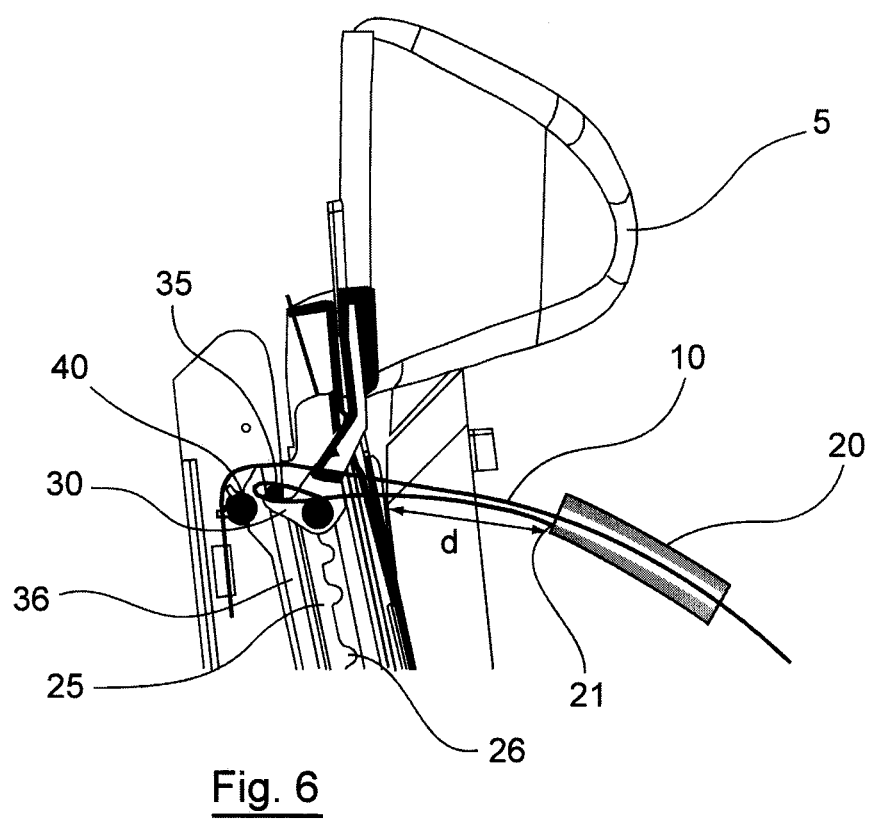
FIG. 6 is an enlarged view of a portion of FIG. 5.

As can be seen more in detail in FIGS. 3 to 9, the headrest 5 can be displaced on seat back 4 to move relative to seat back 4 between a low position shown in FIGS. 3 and 4 and a high position shown in FIGS. 5 and 6. Several intermediary positions can be provided, as in the example shown. This adjustment in height, substantially vertically according to the X axis is made possible thanks to, for example, a rack 25 extending according to the X axis comprising a plurality of notches 26, each notch 26 corresponding to a position of the headrest 5 on the seat back 4.

The headrest 5 comprises a substantially horizontal adjuster bar 27, which can come to be housed inside each of the notches 26, in order to occupy the position given by the corresponding notch 26. In the example shown, the seat 1 comprises four racks 25 and two adjuster bars 27 of which each end is mobile in translation in a rack. The seat 1 could also comprise a single adjuster 27 and two racks 25 without leaving the scope of the present disclosure.

The headrest 5 also comprises fastener means of selective fastening 30 of each retaining element 21 configured in such a way as to maintain substantially constant the apparent length d of the retaining element 21 of the strap-receiving pad 20 when the headrest 5 is displaced on a portion of seat back 4 between a predefined intermediary position and the high position of the headrest 5 and to allow this apparent length to vary when headrest 5 is displaced on another portion of seat back 4 between the low position and the predefined intermediary position. Indeed, the retaining elements 21 are fixed to means of maintaining cooperating with means of selective fastening, in such a way that the means of maintaining are fastened to the headrest 5 when the headrest 5 is between the high position and the predefined intermediary position and separated from the headrest 5 and fastened to the seat back 4 when the headrest 5 is between a predefined intermediary position and the low position. The predefined intermediary position is a position between the low position and the high position.

The apparent length d of the retaining element 21 corresponds to the visible portion of the retaining element 21 on the front side of the seat 1 and can be concealed by the shoulder straps 11. The apparent length d of the retaining element 21 can, according to the present disclosure, be constant or variable according to the position of the headrest 5.

In the example shown, the predefined intermediary position corresponds to the position of the headrest 5 when the adjuster bar 27 is triggered in the notch 26a shown in FIG. 4. This notch 26a could also be located substantially on the same level as the lower end of the slide rail 36.

In the example shown, the means of maintaining include at least one rod 35 and the seat 1 comprises at least one slide rail 36 for supporting the rod 35 for up-and-down movement relative to the seat back 4 during up-and-down movement of headrest 5 relative to the seat back 4. In illustrative embodiments, slide rail 36 is configured to provide a rod-receiving slot shown, for example, in FIG. 4 in which rod 35 included in headrest 5 is constrained to move during up-and-down movement of headrest 5 relative to seat back 4. In an embodiment that is not shown, the slide rail 36 comprises an open upper end, for example, in order to facilitate the installation of the rod 35 in particular.

In this example, the ends of the rod 35 are retained and mobile by sliding each one in a slide rail 36, and the means of maintaining comprises the rod 35. In total, in the example shown, the seat 1 comprises two rods 35 each able to slide in two slide rails 36 at their ends, or four slide rails, or one rod 35 and two slide rails 36 for the two retaining elements 21.

In the example shown, each retaining element 21 forms a buckle around a rod 35 in such a way as to be fastened to the rod 35 for movement therewith as rod 35 is mobile in translation within the corresponding slide rail 36. The fastening means 30 is arranged to drive the rod 35 to slide in the slide rail 36 when the headrest 5 is displaced relative to the seat back 4 between the predefined intermediary position given by the notch 26a and the high position.

The fastening means 30 comprises (in the example shown) at least one driving hook 30 visible in the FIGS. 3 to 6 in particular. In the example shown, the fastening means 30 comprises, as can be seen in the FIGS. 7 to 9, two driving hooks 30 for each one of the means of maintaining, in particular rod 35, arranged each one in the vicinity of an end of a rod 35 in such a way as to not enter into contact with the retaining element 21. In total, there are therefore four driving hooks, this number not being restricted and able to be different, in particular equal to two, without departing from the scope of the present disclosure.

Headrest 5 includes a head-chamber unit configured to receive a head of a child seated on seat bottom 3 and a unit-support frame coupled to head-chamber unit to move therewith relative to seat back 4 as suggested in FIGS. 1-6. Unit-support frame includes a driving hook 30 that is arranged to mate with the rod 35 during movement of the headrest 5 as suggested in FIGS. 3-6. Unit-support frame also includes a foundation coupled to head-chamber unit and arranged to extend rearwardly through an opening formed in seat back 4 and coupled to adjuster bar 27 and to driving hook 30 as suggested in FIGS. 3, 4, 6, and 7.

In the embodiment shown, the racks 25 include X notches, corresponding to as many possible positions for the headrest 5. For the purposes of information, these positions can correspond to apparent lengths d of retaining elements 21 such as defined in the following table:

| Range of displacement | Position | Apparent length d (cm) |
|---|---|---|
| Lower range | P1 | 5 |
|  | P2 | 7.5 |
| Upper range | P3 | 10 |
|  | P4 | 10 |
|  | P5 | 10 |
|  | P6 | 10 |

The present disclosure therefore proposes a new approach in controlling the position of the tubular strap-receiving pads 20 along the shoulder straps 12 that carry them, according to the position of the headrest 5 in relation to the seat back 4. This control is complex, and is not linear, as it is based on a precise analysis of the physical size and shape characteristics of children according to their size and/or their weight, in such a way as to optimise the positioning of the strap-receiving pads 20 along their companion shoulder straps 11. For this, two different behaviors are defined, associated to two ranges of displacement of the headrest 5 relative to the seat back 4. In a first range, called the upper range, the retaining elements 21 have a displacement linked to the headrest 5 when the headrest 5 is between said high position and a predefined intermediary position. In a second range, called the lower range, the retaining elements 21 are separated from the headrest 5 and fastened to the seat back 4 when the headrest 5 is between said predefined intermediary position and the low position. Of course, the global number of positions and the number of positions in each range can vary, according to needs, likewise as the apparent lengths d of retaining elements 21, which are provided for the purposes of information.

The seat 1 comprises, in the example shown and for each retaining element 21, a lower end 37 of the slide rail 36 as shown, for example, in FIG. 9. Lower end 37 of the slide rail 36 forms a retaining means for the rod 35 when the headrest 5 is in a position between the low position and the predefined intermediary position.

As such, the apparent length d of the retaining element 21 is variable according to the displacement of the headrest 5 between the low position and the predefined intermediary position. It is minimum in the low position and increases when the headrest 5 rises on the seat back 4 to assume relatively higher positions. Indeed, for these positions of the headrest 5 included between the low position and the predefined intermediary position, the rod 35 and therefore one end of the retaining element 21 is fixed and maintained in the retaining element formed by the lower end 37 of the slide rail 36. As the total length of the retaining element 21 is fixed, when the headrest 5 is in low position, the distance between the end fixed on the rod 35 of the retaining element 21 which is fixed and the opening 19 of the headrest 5 is maximal and therefore the apparent length d corresponding to the length of the retaining element 21 between the opening 19 and the end of the retaining element 21 fixed to the tubular strap-receiving pad 20 is minimal. This apparent length d increases little by little, as the headrest 5 rises on the seat back 4 towards the predefined intermediary position.

At least one deflecting rod 40 is fixed relatively to the seat shell 2, at the rear of the seat shell 2, in the upper portion and is arranged so that the harness 10 can slide around this deflecting rod 40. In the example shown, the seat 1 comprises two deflecting rods 40 aligned together, maintained at their ends by bearings 45 or notches or fastenings to the rod 40, without contact with the harness 10.

The headrest 5 further comprises at least one opening 41, for example a slot, corresponding to the opening 19, and made in the element of lining of the headrest 5. The opening 41 is provided in order to allow for the passing of the harness 10 and of the retaining element 21 from the rear side of the seat 1 towards the front side of the seat 1.

The headrest 5 comprises means of deviating 42 of the retaining element 21 and also of the harness 10, arranged in order to modify and vary the apparent length d of the retaining element 21 when the headrest 5 is displaced between the low position shown in FIGS. 3 and 4 and the predefined intermediary position mentioned hereinabove. The means for deviating 42 is constituted in the example shown by the upper edge of the opening 41.

It can be considered that the retaining element 21 has two portions, i.e. a portion hidden by the seat shell 2, comprising an end of the retaining element 21 fixed to the rod 35, and a visible portion comprising an end of the retaining element 21 fixed to the companion strap-receiving pad 20. Between the low position and the predefined intermediary position, the apparent length d of the retaining element 21 varies at least in part thanks to the means of deviating 42 formed, in the example shown, by an upper edge of the opening 41 from a minimum length to a maximum length. This apparent length d is maintained substantially constant and maximal when the headrest 5 is displaced on the seat back 4 between the predefined intermediary position and the high position thanks to the sliding of the rod 35 inside the slide rail 36 using the driving hook 30 fixed relatively to the headrest 5.

In order to allow for the passing and the displacement of the retaining elements 21, of the harness 10 and of a portion of the headrest 5, the seat back 4 can comprise, as can be seen in FIGS. 7 to 9, at least one (two in the example shown) opening 50, of rectangular form in the example shown, extending over a height that is sufficient to allow for the displacement of the headrest 5 in the rack 25. These openings 50 can be concealed by the headrest 5 when the front of the seat 1 is viewed.

The present disclosure is of course not restricted to the example embodiment which has just been described. All or a portion of the numbers of retaining elements 21, rods 35, slide rails 36, racks 25, adjuster bars 27 or 40 can be modified without leaving the scope of the present disclosure. Means can be provided in order to separate them from the strap-receiving pads, for example, in order to allow for the cleaning of the latter.

Moreover, the fastening means 30 can be carried out by other means than a driving hook 30. The means of deviation 42, when it exists, can be carried out by other means than the edge of the opening 41 of the headrest 5. The means of maintaining can be constituted by other means than the rod 35. The headrest 5 can be displaced in translation relatively to the seat back 4 by a means other than by sliding in a rack 25.

In certain embodiments, the seat 1 can occupy, other than the seated position, at least one inclined position. In this case, the seat back 4 is inclined, and the X axis according to the movement of the seat back 4, is no longer vertical, but extends according to the inclination of the seat back 4. Generally, the X axis may not be vertical but inclined, still remaining the axis of the seat back 4.

In the example shown, the seat 1 comprises means of maintaining of each retaining element and means of deviating, in such a way as to vary the apparent length of the retaining element of the strap-receiving pad when the headrest 5 is displaced over a portion of displacement between the low position and the predefined intermediary position. It is within the scope of the present disclosure to provide that the seat comprises only means of maintaining of each retaining element 21 or only means of deviating or any other system for obtaining a similar result, i.e. a variation in the apparent length when the headrest 5 is displaced between the low position and the predefined intermediary position.

In an embodiment that is not shown and for certain positions of the headrest 5, the strap-receiving pads 20 can be partially housed inside the seat 1, by passing through slots 19, and therefore partially not visible from the outside of the seat 1.

As such, according to the present disclosure, the seat 1 is configured in such a way as to maintain substantially constant an apparent length of the retaining element 21 of the strap-receiving pad 20 when the headrest 5 is displaced over at least one portion of displacement on the seat back 4 between the predefined intermediary position and the high position. The seat 1 is in addition configured in such a way in accordance with the present disclosure as to vary the apparent length d of the retaining element 21 of the strap-receiving pad 20 when the headrest 5 is displaced over a portion of displacement between the low position and the predefined intermediary position.

"Apparent length" herein designates the length of the visible portion of the retaining element 21 between the opening of the headrest 5 that the retaining element 21 crosses and the strap-receiving pad 20, more precisely the first edge of the strap-receiving pad 20 encountered, starting from the opening of the headrest 5, on the front side of the seat 1, i.e., on the side of the seat 1 that receives the child. The total length of the retaining element 21 is constant.

In accordance with the present disclosure, the apparent length of the retaining element 21 of the strap-receiving pad 20 is variable over a portion of the displacement of the headrest 5 relative to the seat back 4 and it is substantially constant over another portion of displacement of the headrest 5 relative to the seat back 4. As such, as the child grows, and therefore the displacement of the headrest 5 on the seat back 4 changes, the strap-receiving pad 20 is always positioned correctly on the shoulders of the child as the child grows, regardless of the position of headrest 5 relative to the seat back 4.

The headrest 5 can comprise at least one, in particular two, openings, for example slots, allowing for the passing of the retaining element 21, and also of the shoulder straps 11, from the rear of the seat 1 towards the front of the seat 1 (when the child is placed), the openings of the headrest 5 being fastened in displacement of the headrest 5.

The seat back 4 can comprise at least one, in particular two, openings, advantageously concealed by the headrest 5, allowing for the passing of the retaining elements 21, shoulder straps 11, and also a portion of the headrest 5, in such a way as to allow for the displacement of the headrest 5 on the seat back 4. The presence on the headrest 5 of openings through which pass the harness 10 and the retaining elements 21 makes it possible, when the headrest 5 is displaced, to displace in height also an upper end of the shoulder straps 11, which is the portion of the harness 10 located on the opening, and the retaining elements 21. This makes it possible to adjust the position of the harness 10 and of the retaining elements 21 to the stature of the child, on the shoulders of the child.

Each retaining element 21 can consist, for example, of one strap. The means of maintaining the retaining elements 21 can include at least one rod 35 configured to retain the retaining element of the strap-receiving pads 20. The seat 1 can furthermore include at least one slide rail 36 fixed relatively to the seat back 4, the rod 35 being able to slide in the slide rail 36.

The rod 35 can be arranged in order to retain the retaining element 21 at one end thereof, for example. The retaining element 21 of the strap-receiving pad 20 can in particular form a buckle around the rod 35.

The means of selective fastening can comprise, for example, at least one driving hook 30 fastened in displacement to the headrest 5. This driving hook 30 is configured to drive the means of maintaining of the retaining element 21, for example the rod 35, by sliding in the slide rail or rails 30, when the headrest 5 is displaced over the portion comprised substantially between the predefined intermediary position and the high position.

Over this portion of displacement of the headrest 5, the means of selective fastening are active and fasten the means of maintaining to the headrest 5. Between the low position and the predefined intermediary position of the headrest 15, the means of selective fastening are inactive and separate the means of maintaining from the headrest 5 in such a way that the means of maintaining are fastened to the seat back 4 and not the headrest 5.

The retaining element 21 can be mobile in rotation relatively to the means of maintaining, for example, mobile in rotation around the rod 35. The rod 35 can be mobile in rotation inside the slide rail 36. This mobility or these mobilities in rotation can facilitate the movements of the retaining element 21 and of the rod 35 along the slide rail 36. Each slide rail 36 can extend substantially in parallel to a plane of displacement of the headrest 5.

The means of maintaining can cooperate with a portion of the seat back 4, when the headrest 5 is in a position between the low position and the predefined intermediary position. Said portion of the seat back 4 can, for example, comprise a lower end of the slide rail 36 forming a retaining zone of the rod 35 when the headrest 5 is in a position between the low position and the predefined intermediary position, in such a way as to vary the apparent length d of the retaining element 21 of the strap-receiving pad 20 when the headrest 5 is displaced over a portion of displacement between the low position and the predefined intermediary position.

The lower end of the slide rail 36 can as such define the height of the predefined intermediary position. In this case, the fixed retaining element 21 relatively to the rod 35 can be retained at the height of the predefined intermediary position when the headrest 5 is located in a position between the low position and the predefined intermediary position. As such, the apparent length d of the retaining element 21 is minimal for the low position of the headrest 5. Then it increases with the displacement of the headrest 5 up to a maximum position in the predefined intermediary position.

Between the predefined intermediary position and the high position of the headrest 5, the rod 35 can be displaced at the same time as the headrest by the fastening means 30 mentioned hereinabove, which makes it possible to have an apparent length d that is constant.

The seat 1, and in particular the headrest 5, can comprise means of deviating configured to, between the low position and the predefined intermediary position, deviate the retaining element 21 of the strap-receiving pad 20, for example, modify or act on the form of the retaining element 21, in such a way as to vary the apparent length d of the retaining element 21 of the strap-receiving pad 20. In this case, the means of deviating is configured in such a way that the deviation of the retaining element 21 varies according to the displacement of the headrest 5. The means of deviating can be configured in such a way that the deviation of the retaining element 21 is maximal in the low position of the headrest 5 and that the deviation decreases as the headrest 5 is displaced until an absence of deviation in the predefined intermediary position of the headrest 5.

Thanks to the means of deviating, the apparent length d of the retaining element 21 of the strap-receiving pad 20 varies according to the position of the headrest 5 on the seat back 4 and therefore according to the size of the child, when the child is small, i.e., for the intermediary low positions of the headrest 5 comprised between the low position and the predefined intermediary position. As such, when the deviation is maximal in low position, the apparent length d of the retaining element 21 is the smallest. This deviation is less substantial as the headrest 5 is displaced until an absence of deviation or a very low deviation in the predefined intermediary position f the headrest 5.

The means of deviating can include at least one edge of the opening, in particular the upper edge of the latter, made in the headrest 5 for the passing of the retaining element 21 and possibly of the harness 10. The means of deviating can be fixed relatively to the headrest 5. The means of deviating makes it possible, when it includes an edge of the opening, to deviate the path of the retaining element 21, in such a way as to reduce the apparent length d.

The structure can include a system of translation of the headrest, comprising, for example, at least one rack 25 provided with notches 26, the headrest 5 being mobile in translation along this rack 25. The headrest 5 is able to occupy a plurality of positions corresponding to the notches 26 between the low position and the high position. The slide rail 36 can be substantially parallel to the rack 25 on a portion of the rack 25. The headrest 5 can be mobile in translation between the low position and the high position using another system of translation not being restricted to the rack 26.

The seat 1 can include a deflecting rod 40 around which can slide the harness 10. The rod 40 is illustratively fixed relatively to the seat back 4.

Other than the seat 1, the seat back 4, and the headrest 5, the structure can include a base in relation to which the seat 1 can slide in order to allow the seat 1 to occupy a seated position and at least one inclined position.

The predefined intermediary position can be chosen in such a way that a child growing, for example, between the ages of a few months to four years, is always restrained correctly in the seat 1, with the strap-receiving pads 20 positioned correctly, as the headrest 5 is displaced in order to adapt its position to the size of the child. Indeed, as explained hereinabove, for the positions of the headrest 5 located below the predefined intermediary position, the apparent length d will vary from a short length up to a maximum length which will be retained for the positions of the headrest 5 located above the predefined intermediary position.

Those skilled in the art will know how to determine starting at what size of the child it is preferable that the length of the retaining element 21 of the strap-receiving pads 20 remain constant despite the displacement of the headrest 5. This size will determine the predefined intermediary position.

Figure 10:
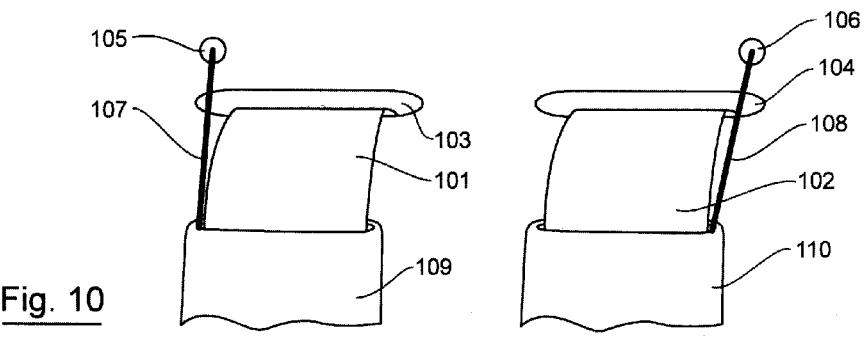
FIG. 10 diagrammatically shows an example of a headrest made in accordance with the present disclosure and formed to include having separate passages of the retaining element of the slots for passing shoulder straps of a child restraint harness included in the seat.

In order to minimize the risk of allowing the retaining element to become stuck or blocked under the shoulder strap in one of the slots, the present disclosure proposes, in certain embodiments, to provide passages, or openings, separate from the slots of passage for the shoulder straps 11. Such a solution is shown, for example, in FIG. 10.

The shoulder straps 101 and 102 circulate in two slots 103 and 104 formed in the headrest 5. Two separate openings 105 and 106 are arranged in the headrest 5, wherein circulate the retaining elements 107 and 108, connected respectively to the strap-receiving tubes 109 and 110.

As such, there is no risk that the shoulder straps 101 and 102 disturb the displacement and the positioning of the retaining elements 107 and 108. Moreover, these specific openings 105 and 106 are of reduced size, in relation to slots 103 and 104, and are positioned according to need, in such a way as to optimise the guiding and the positioning of the retaining elements.

Figure 11:
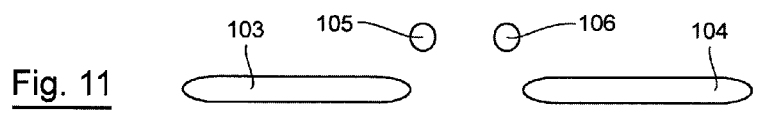
FIGS. 11-15 show alternatives of the embodiment disclosed in FIG. 10.
Figure 12:
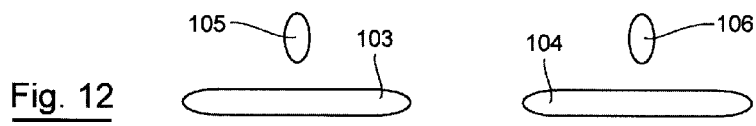
Figure 13:
Figure 14:
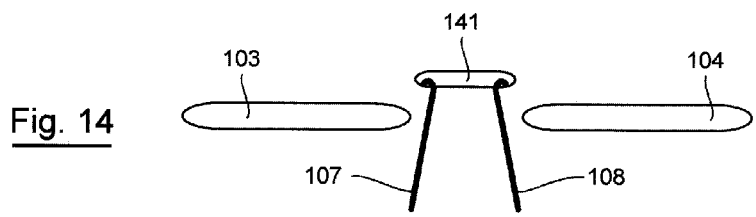

According to needs, and as shown in FIGS. 11 to 13, the openings can be of a chosen form and location. It is also possible to provide a single opening 141, as shown in FIG. 14.

Note that this approach can be used independently of the fastening means described hereinabove.

Figure 15:
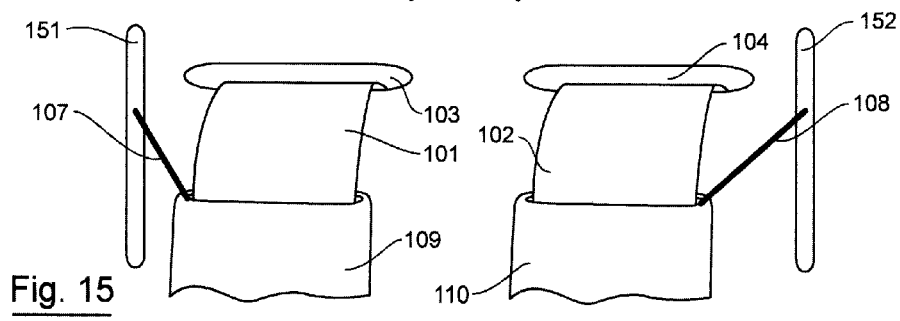

According to yet another approach, shown in FIG. 15, the specific openings 151, 152 extend substantially vertically (or more precisely substantially parallel to the axis of displacement of the headrest 15). This approach allows for a more direct alignment (limiting friction) of the retaining element, which can be displaced in its opening 151, 152, according to the position of the headrest 15. It is indeed important to note that, according to the present disclosure, the control of the apparent length of the retaining elements is provided by the fastening means and not by the position of the slots for passing the shoulder straps.

The invention claimed is:

1. Seat for children intended to be installed in a vehicle, in particular an automobile, comprising a seat shell including a seat bottom and a seat back, and a headrest mobile in translation relatively to the seat back between a low position to lie at a first distance from the seat bottom and a high position to lie at a relatively greater second distance from the seat bottom, a retaining element, and a child-restraint harness adapted to maintain a child seated on the seat bottom and configured to include two shoulder straps, each shoulder strap carrying a strap-receiving pad connected to the seat shell by the retaining element independently of the harness, characterised in that said retaining element is coupled to a rod included in the seat and the seat further comprises fastening means for fastening the rod to the headrest in such a way that the rod is fastened to the headrest to link the retaining element to move with the headrest relative to the seat back and cause the retaining element to move the strap-receiving pads relative to the shoulder straps when the headrest is located and moved between the high position and a predefined intermediary position and then separated from the headrest and fastened to the seat back when the headrest is located between the predefined intermediary position and the low position.

2. Seat according to claim 1, wherein the fastening means comprises at least one driving hook fastened to the headrest to move therewith relative to the seat back and configured to drive the rod to slide in a rod-receiving slot formed in a slide rail included in the seat and coupled to the seat shell during up-and-down movement of the headrest between the predefined intermediary and high positions.

3. Seat according to claim 2, wherein the slide rail extends substantially parallel to a plane of displacement of the headrest relative to the seat back on one portion only of a course of motion of the headrest relative to the seat back during movement of the headrest between the predefined intermediary position and the high position.

4. Seat according to claim 2, wherein the rod cooperates with a portion of the seat back to remain in a stationary position relative to the seat back when the headrest is in a position between the low position and the predefined intermediary position.

5. Seat according to claim 4, wherein the portion of the seat back comprises a lower end of the slide rail forming a retaining surface supporting the rod in the stationary position when the headrest is in a position between the low position and the predefined intermediary position.

6. Seat according to claim 1, wherein the headrest comprises length-adjustment means for deviating an apparent length (d) of the retaining element in response to movement of the headrest between the low position and the predefined intermediary position to deviate the retaining element in such a way as to vary the apparent length (d) of the retaining element measured between the seat back and a companion strap-receiving pad during movement of the headrest between the low position and the predefined intermediary position.

7. Seat according to claim 6, wherein the length-adjustment means is configured in such a way that the deviation of the retaining element varies according to the displacement of the headrest relative to the seat back.

8. Seat according to claim 6, wherein the length-adjustment means is configured in such a way that the deviation of the retaining element is maximal in the low position of the headrest and that the deviation decreases as the headrest is displaced until an absence of deviation in the predefined intermediary position of the headrest and between the predefined intermediary and high positions of the headrest.

9. Seat according to claim 1, further comprising a deflecting rod around which can slide the harness and the deflecting rod is fixed relatively to the seat shell.

10. Seat according to claim 1, characterized in that said headrest has at least one slot allowing for passing of said shoulder straps and at least one opening separate from said slot or slots, allowing for passing of said retaining elements.

11. Seat according to claim 1, wherein a first end of each retaining element is coupled to the rod, a second end of the retaining element is coupled to a companion one of the strap-receiving pads, and each retaining element is arranged to pass through and move in an opening found in the seat back.

12. Seat according to claim 1, wherein the seat further comprises at least one slide rail coupled to the seat shell and the rod is constrained to slide in a rod-receiving slot formed in the at least one slide rail and move the retaining element relative to the seat back only during movement of the headrest relative to the seat back between the predefined intermediary position and the high position.

13. A juvenile vehicle seat comprising
a seat shell including a seat bottom arranged to support a child and a seat back arranged to extend upwardly from the seat bottom,
a headrest mounted for up-and-down movement on the seat back relative to the seat bottom,
a child-restraint harness coupled to the seat shell, the child-restraint harness including first and second shoulder straps adapted to restrain the shoulders of a child seated in the seat shell, a first strap-receiving pad coupled to the first shoulder strap and arranged to engage a first shoulder of a child seated in the seat shell, a second strap-receiving pad coupled to the second shoulder strap and arranged to engage a second shoulder of a child seated in the seat shell, each strap-receiving pad being mounted for movement on and along its companion shoulder strap to occupy a position on that shoulder strap that is a function of the size of the child seated on the seat bottom and the height of the headrest above the seat bottom, and
pad-positioner means for changing the position of each strap-receiving pad on a companion one of the shoulder straps in response to up-and-down movement of the headrest on the seat back to cause each of the strap-receiving pads to be separated from the headrest and linked to the seat shell to allow movement of the headrest relative to the seat back without moving the first strap-receiving pad relative to the first shoulder strap and without moving the second strap-receiving pad relative to the second shoulder strap in a lower range of movement of the headrest relative to the seat back between a low position and a relatively higher predefined intermediary position above the seat bottom and to be linked to the headrest to move therewith relative to the seat back and cause movement of the first strap-receiving pad relative to the first shoulder strap and of the second strap-receiving pad relative to the second shoulder strap in an upper range of movement of the headrest relative to the seat back between the predefined intermediary position and a relatively higher high position above the seat bottom.

14. The seat of claim 13, wherein the pad-positioner means includes a rod mounted for up-and-down movement in a rod-receiving slot formed in the seat back and a first retaining element having one end coupled to the rod and an opposite end coupled to the first strap-receiving pad.

15. The seat of claim 14, wherein the headrest includes a head-chamber unit configured to receive a head of a child seated on the seat bottom and a unit-support frame coupled to the head-chamber unit to move therewith relative to the seat back and arranged to lie between the head-chamber unit and the seat bottom and the unit-support frame includes a driving hook arranged to mate with the rod during movement of the headrest only between the predefined intermediary position and the high position and to provide drive means for moving the rod in the rod-receiving slot formed in the seat back during movement of the headrest between the predefined intermediary position and the high position to cause the first retaining element to move relative to the seat back and to the first shoulder strap so that the first strap-receiving pad moves relative to the first shoulder strap to assume a new position on the first shoulder strap.

16. The seat of claim 15, wherein the seat back is formed to include a first opening and the first retaining element passes through the first opening.

17. The seat of claim 15, wherein the unit-support frame includes deviation means for moving the first retaining element relative to the seat back from an initial path to extend along a deviated path to cause movement of the first strap-receiving pad relative to the first shoulder strap without any movement of the rod in the rod-receiving slot relative to the seat back only during movement of the headrest from the low position to the predefined intermediary position to change an apparent length (d) of the first retaining element measured between the seat back and the first strap-receiving pad.

18. The seat of claim 17, wherein the drive means is configured to move the first strap-receiving pad on the first shoulder strap without changing the apparent length (d) of the first retaining element only during movement of the headrest between the predefined intermediary position and the high position.

19. The seat of claim 17, wherein the unit-support frame includes a foundation coupled to the head-chamber unit and arranged to extend rearwardly through an opening formed in the seat back and terminate at a free end thereof and an adjuster bar coupled to the free end and arranged to engage notches formed in the seat back to secure the head-chamber unit of the headrest at a desired height relative to the seat bottom and the first retaining element is arranged to extend through a first opening formed in the unit-support frame between the deviation means and the adjuster bar.

20. The seat of claim 19, wherein the seat back is formed to include a first opening located between the first strap-receiving pad and the first opening formed in the unit-support frame and the first retainer element is arranged to extend through each of the first openings.

21. The seat of claim 20, wherein the first shoulder strap is also arranged to extend through each of the first openings.

22. The seat of claim 19, wherein the driving hook is coupled to the free end of the foundation of the unit-support frame and formed to include a rod-receiving recess arranged to confront and open toward the rod to receive a portion of the rod therein following movement of the headrest from the low position to the predefined intermediary position and retain the portion of the rod therein during movement of the headrest from the predefined intermediary position to the high position.

23. The seat of claim 22, wherein the driving hook is arranged to lie in a space provided between the rod and the adjuster bar.

24. The seat of claim 22, wherein the deviation means includes a flange terminating at an edge and lying in spaced-apart relation to the driving hook and the first retaining element extends along a path between the edge and the driving hook.

25. The seat of claim 15, wherein the unit-support frame includes a foundation coupled to the head-chamber unit and arranged to extend rearwardly through an opening formed in the seat back and terminate at a free end thereof and an adjuster bar coupled to the free end and arranged to engage notches formed in the seat back to secure the head-chamber unit of the headrest at a desired height relative to the seat bottom and the drive means is a driving hook coupled to the free end of the foundation of the unit-support frame and formed to include a rod-receiving recess arranged to confront and open toward the rod to receive a portion of the rod therein following movement of the headrest from the low position to the predefined intermediary position and retain the portion of the rod therein during movement of the headrest from the predefined intermediary position to the high position.

26. The seat of claim 25, wherein the driving hook is arranged to lie in a space provided between the rod and the adjuster bar.

27. The seat of claim 25, wherein the unit-support frame includes a flange terminating at an edge and lying in spaced-apart relation to the driving hook and the retaining element extends along a path between the edge and the driving hook.

28. The seat of claim 25, wherein the unit-support frame includes a flange facing toward the adjuster bar and the first retaining element is arranged to extend through a first opening formed in the unit-support frame between the flange and the adjuster bar.

29. The seat of claim 28, wherein the seat back is formed to include a first opening located between the first strap-receiving pad and the first opening formed in the unit-support frame and the retainer element is arranged to extend through each of the first openings.

30. The seat of claim 29, wherein the first shoulder strap is also arranged to extend through each of the first openings.

31. The seat of claim 14, wherein the seat back is formed to include a first opening and the first retaining element passes through the first opening.

32. The seat of claim 15, wherein the headrest is formed to include a first opening and the first retaining element is also arranged to pass through the first opening formed in the headrest.

33. The seat of claim 13, wherein the pad positioner means further includes a second retaining element having one end coupled to the rod and an opposite end coupled to the second strap-receiving pad.

34. The seat of claim 33, wherein the headrest includes a head-chamber unit configured to receive a head of a child seated on the seat bottom and a unit-support frame coupled to the head-chamber unit to move therewith relative to the seat back and arranged to lie between the head-chamber unit and the seat bottom and the unit-support frame includes a driving hook arranged to mate with the rod during movement of the headrest only between the predefined intermediary position and the high position and to provide drive means for moving the rod in the rod-receiving slot formed in the seat back during movement of the headrest between the predefined intermediary position and the high position to cause the first retaining element to move relative to the seat back and to the first shoulder strap so that the first strap-receiving pad moves relative to the first shoulder strap to assume a new position on the first shoulder strap and simultaneously to cause the second retaining element to move relative to the seat back so that the second strap-receiving pad moves relative to the second shoulder strap to a new position on the second shoulder strap.

35. The seat of claim 34, wherein the seat back is formed to include a first opening and a second opening arranged to lie in spaced-apart relation to the first opening, the first retaining element passes through the first opening, and the second retaining element passes through the second opening.

36. The seat of claim 34, wherein the unit-support frame includes
    first deviation means for moving the first retaining element relative to the seat back from an initial path to extend along a deviated path to cause movement of the first strap-receiving pad relative to the first shoulder strap without any movement of the rod in the rod-receiving slot relative to the seat back only during movement of the headrest from the low position to the predefined intermediary position to change an apparent length (d) of the first retaining element measured between the seat back and the first strap-receiving pad, and
    second deviation means for moving the second retaining element relative to the seat back from an initial path to extend along a deviated path to cause movement of the second strap-receiving pad relative to the second shoulder strap without any movement of the rod in the rod-receiving slot relative to the seat back only during movement of the headrest from the low position to the predefined intermediary position to change an apparent length (d) of the second retaining element measured between the seat back and the second strap-receiving pad.

* * * * *